June 19, 1956     F. W. E. HOESELBARTH     2,750,964
WEAVING WITH HOOK ENGAGEMENT OF SELECTED PILE ENDS
Filed April 16, 1954     9 Sheets-Sheet 1

INVENTOR
Frank W. E. Hoeselbarth
BY
ATTORNEYS.

June 19, 1956 F. W. E. HOESELBARTH 2,750,964
WEAVING WITH HOOK ENGAGEMENT OF SELECTED PILE ENDS
Filed April 16, 1954 9 Sheets-Sheet 4

INVENTOR

Frank W. E. Hoeselbarth
BY
ATTORNEYS.

Fig. 19.

June 19, 1956   F. W. E. HOESELBARTH   2,750,964
WEAVING WITH HOOK ENGAGEMENT OF SELECTED PILE ENDS
Filed April 16, 1954   9 Sheets-Sheet 8

Fig. 20.

INVENTOR
Frank W. E. Hoeselbarth

BY

ATTORNEYS.

Fig. 21.

United States Patent Office 2,750,964
Patented June 19, 1956

2,750,964

WEAVING WITH HOOK ENGAGEMENT OF SELECTED PILE ENDS

Frank W. E. Hoeselbarth, Carlisle, Pa., assignor to C. H. Masland & Sons, Carlisle, Pa., a corporation of Pennsylvania Application April 16, 1954, Serial No. 423,659

22 Claims. (Cl. 139—39)

The present invention relates to the weaving of pile fabrics such as carpets and rugs on velvet and tapestry looms, to the pile fabrics thus produced and the looms which produce the same.

This application has been divided, and the subject matter relating to the fabric is embodied in a divisional application, Serial No. 493,250, filed March 9, 1955, for Pile Fabric Woven With Hook Engagement of Selected Pile Ends.

A purpose of the invention is to permit the creation of floats on a velvet or tapestry loom without the use of a jacquard.

A further purpose is to make it possible to achieve an embossed effect weaving on a velvet or tapestry loom.

A further purpose is to form a pile in the usual manner over wires, but when moving the pile warp down at the next step to bind it behind a weft, to selectively hold up certain ends by hooks, then insert the face weft over those pile warp ends which have been brought down but under those selected pile warp ends which have been brought up, then to release the pile warp ends which have been retained up and shift the hooks laterally to a new position, and then to again raise the pile warp ends over wires, thus forming floats which will remain as float loops if the wires are non-cutting but which will be cut if the wires are cutting wires.

A further purpose is to hold certain pile warp ends up selectively when the binding weft is to be inserted or optionally allow all pile warp ends to go down by triggering the hook mechanism before taking the binding weft shot.

A further purpose is to mount hooks on a hook bar extending laterally above and behind the reed and in front of the heddles, to move the hook bar to a selected lateral position before the pile warp is raised for the particular cycle, to retain selected ends of the hooks, and then to trigger the hooks by moving them laterally to release the selected ends.

A further purpose is to selectively hold up in raised position some, but not all, of the pile warp ends by hooks, and to shift the hooks laterally to any one of a variety of positions so as to engage any one of several selected groups of pile warp ends, releasing the ends not engaged by the hooks to permit them to be bound behind the weft.

A further purpose is to move the hook laterally at a position above the highest position achieved by the pile warp heddle or heddles, and then to lower the hooks into engagement with certain pile warp ends at a particular group of lateral positions.

A further purpose is to manipulate the pile warp ends by long slots in a pile warp heddle or heddles, so that selected ends can be held in raised position by hooks even while the pile warp heddle is down.

A further purpose is to individually tension the pile warp ends by weights applied through long slots, and to release the pull of the weights when the pile warp ends are raised over wires to allow the surplus amount of yarn to weave into the fabric.

A further purpose is to use any desired number of hook bars to engage different ends.

A further purpose is to manipulate the hook bar laterally at a predetermined step in weaving to a distance limited by a pattern control, suitably a jacquard mechanism.

A further purpose is to mount the hooks adjustably on the hook bar so that they can be selectively positioned in slots.

A further purpose is to lock the hook bar selectively in inoperative position.

Further purposes appear in the specification and in the claims.

In the drawings I have chosen to illustrate a few only of the numerous embodiments of my invention, selecting the forms shown from the standpoints of convenience in illustration, satisfactory operation and clear demonstration of the principles involved.

In accordance with the invention, it is possible to obtain floats on a tapestry carpet loom by forming uncut loops, or to form double length tufts appearing above the surface of the normal pile by cutting the floats with cutting wires on a velvet carpet loom to produce a raised effect.

In either case an additional pattern feature is obtained by relatively simple mechanism, and without the need for the relatively large and rather complicated jacquards employed on Wilton looms.

Figure 1:
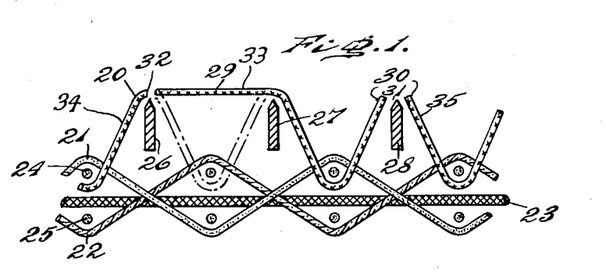
Figure 1 is a warpwise weave diagram showing one weave produced in accordance with the invention.

Figure 1 illustrates a velvet pile carpet weave employing a single pile warp 20, binder warps 21 and 22 and a stuffer warp 23. Face wefts appear at 24 and back wefts at 25. At certain dent positions in accordance with the pattern as later explained, the pile warp is raised over two adjoining wires 26 and 27 to form floats 29 whereas at other dent positions determined by the pattern the pile warp comes up initially over a single wire 28 to form a single pile projection 30.

If cutting wires are employed as shown in Figure 1, when they are withdrawn laterally the normal pile projections 30 are cut at 31 to form cut pile tufts, but the floats 29 are cut at 32 and form extra length tufts 33 and normal length tufts 34 in courses in which the floats exist. The tufts 33 are not cut by the cutting wires as they are not anchored at both ends when the cutting wire 27 is withdrawn, assuming the left wire is withdrawn first. The long tufts 33 can later be sheared if desired.

Figure 2:
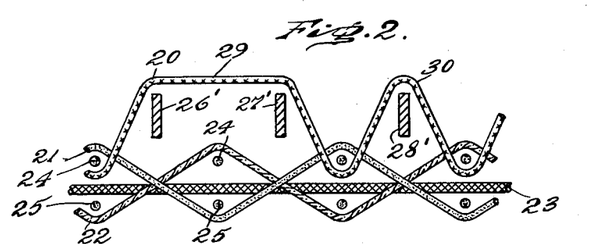
Figure 2 is a view similar to Figure 1 showing a variation.

Figure 2 shows the invention applied with non-cutting wires 26′, 27′ and 28′ which form a float 29, giving a loop pattern effect at the particular dent position.

Figure 3 to 12 inclusive illustrate one form of relatively simple mechanism which may be employed in weaving the fabric of Figures 1 and 2, using a loom operated in accordance with the explanation on Table I and Figures 13, 14 and 15, and desirably also in accordance with Figures 16 and 17, as later explained.

Immediately above the reed 35 and in front of the heddles a hook bar 36 is placed, which is vertically manipulated by heddle mechanism not shown, of a character well known in the art. The hook bar desirably comprises a hook bar housing 37, which is of inverted channel form and has guiding surfaces 38 and 40 to guide a sliding element 41 (Figures 8 and 9) which has notches 42 at intervals along its length to receive and engage head portions 43 at the upper ends of hooks 44 which extend downwardly through an opening 45 in the bottom of the housing. The hooks 44 are desirably of metallic strip having their narrow edges extending warpwise, and near their lower ends the hooks have pile warp engaging hook ends 46 which diverge to the left upwardly from bottom points 47, and produce upwardly directed yarn holding surfaces 48. The yarn holding surfaces 48 preferably are slightly inclined downward toward the strip, so that yarn ends will be held except when the hook moves in a direction to detach the yarn.

mediate its ends located on the frame, and tension spring 62 keeps the plunger abutment 56 in engagement with the lever by pulling from the lever to spring abutment 63 on the plunger head.

The motion of the lever is controlled by cam 64 (Figures 5 and 6) on loom shaft 65 turning in the direction shown and having an external track 66 which engages follower roller 67 on follower lever 68 pivoted at one end at 70 on the frame. The follower lever is connected at the other end at 71 with the remote end 72 of plunger control lever 57, by flexible connection 73 so that when the high area 74 of the cam forces the follower roller 67 away from the cam center, the plunger 53 is pulled to the left in Figures 3 and 4 under the resilient action of spring 62, whereas when cam recesses 75 engage the follower roller 67 the plunger is returned to the position shown in Figure 3.

Figure 4:
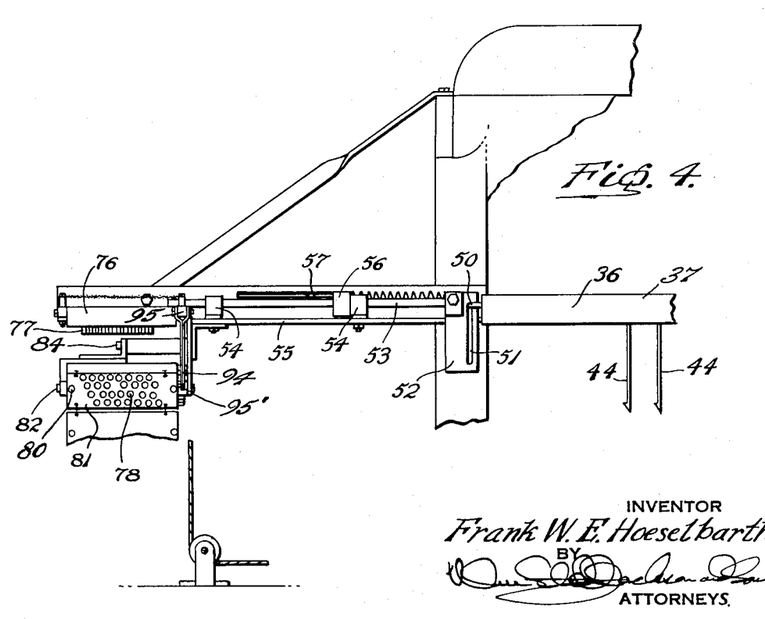
Figure 4 is a fragmentary diagrammatic front elevation of the structure of Figure 3.
Figure 5:
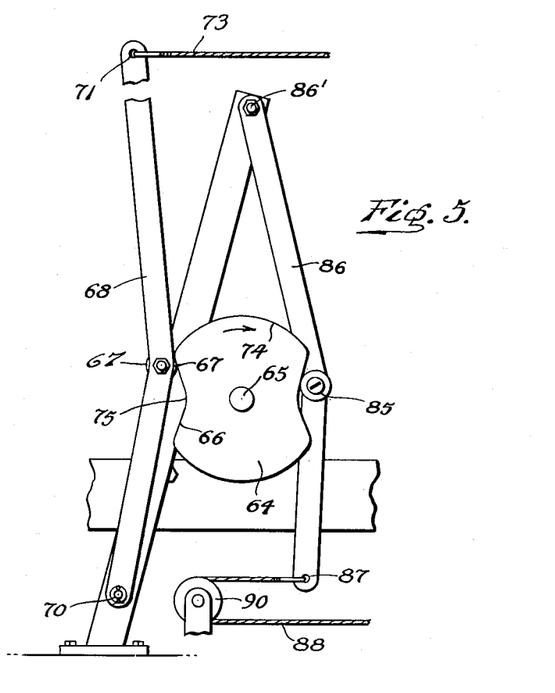
Figure 5 is a rear end elevation showing the cams at the right side of the loom, omitted in Figures 3 and 4.
Figure 6:
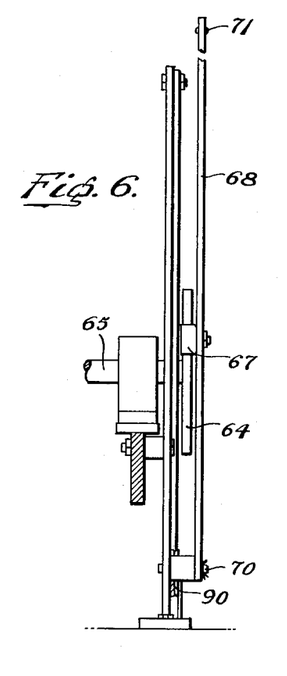
Figure 6 is a right end elevation of the loom showing the cam structure of Figure 5.
Figure 7:
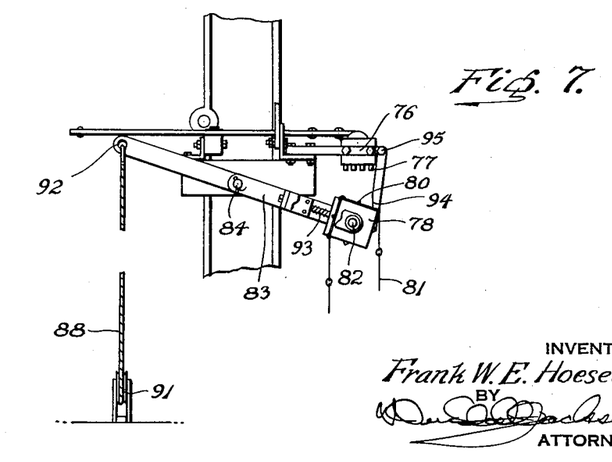
Figure 7 is a left end elevation of the loom showing the jacquard cylinder and the cards.
Figure 8:
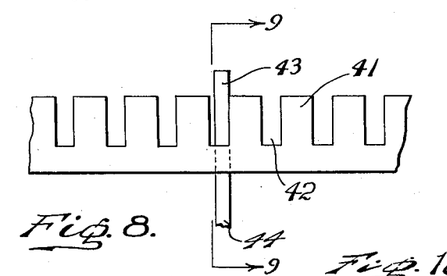
Figure 8 is a fragmentary detail showing the mounting of the hooks on the hook bar in front elevation.
Figure 9:
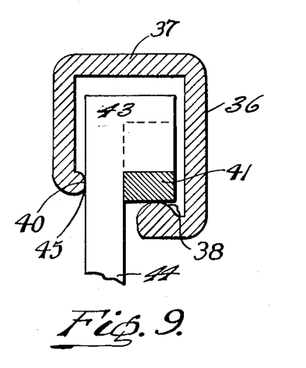
Figure 9 is a fragmentary section on the line 9—9 of Figure 8.
Figure 10:
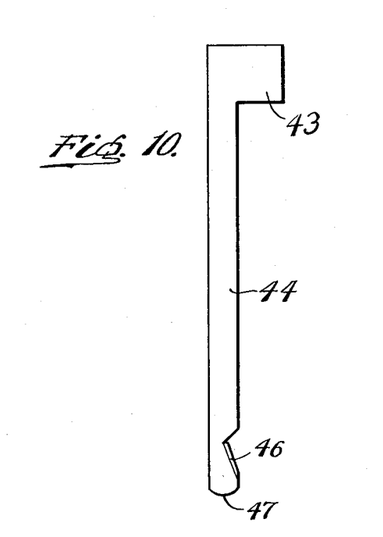
Figure 10 is a side elevation of one of the hooks.
Figure 11:
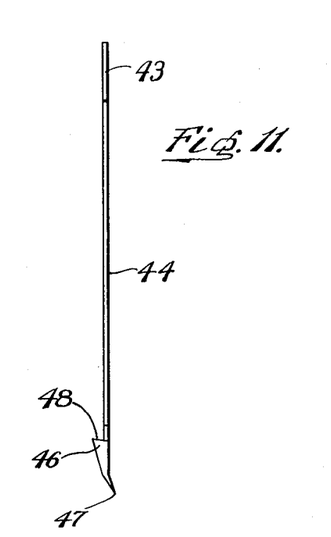
Figure 11 is a front elevation of the hook of Figure 10.
Figure 12:
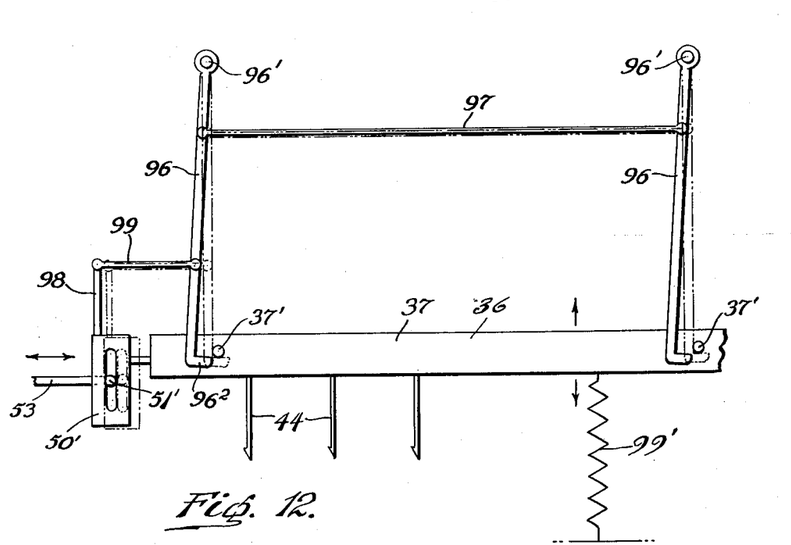
Figure 12 is a front elevation of a locking device for the mechanism of Figures 3 to 11.

Any suitable type of pattern control may be used, and where a jacquard mechanism is employed, it may be a very simple mechanism, rather than the more complex type involved in Wilton weaving. The jacquard may be of any well known character, either of the positive type where the card has a hole for the selected pin, or of the negative type, where the card has a blank for the selected pin, or of the electrical form where contacts are made by either a hole or a blank, in the card. A mechanical negative jacquard is here shown for simplicity. A jacquard plate 76 has a series of openings corresponding to the jacquard positions, each opening containing a pin 77 which in the retracted position, when no selection is being made, drops by gravity as shown in Figures 4 and 7, being prevented from falling out by suitable engagement of its head with the top of the plate.

Each of the selecting pins 77 corresponds to a different position laterally of the loom, and determines how

*Table I*

| Position | Pile Warp Heddle | Binder Warp Heddle | Stuffer Warp Heddle | Hook Bar, Horizontal Motion | Hook Bar, Vertical Motion | Cylinder, Vertical Motion | Cylinder Index | Hook Action on Pile |
|---|---|---|---|---|---|---|---|---|
| 1 | Up | Down | Mid | Limited by Selected Pin. | Up | Up Selecting | Card Indexed | Hooks below pile ends. |
| 2 | Down | Mid | Down | Same | Mid | Same | Same | Selected ends held up by hooks. |
| 3 | Same | Same | Same | Moves to Right | Same | Down | New Card | Selected ends released. |
| 4 | Same | Same | Same | Same | Same | Moves Up | Same | No ends on hooks |
| 5 | Same | Same | Same | Same | Moves up | Up Selecting | Same | Same. |
| 6 | Same | Same | Same | Moves to Left | Continues moving up. | Same | Same | Same. |

The positions at which the hooks are placed weftwise of the fabric will depend upon the particular pattern. The hooks will, in some cases, be distributed evenly or they will in other cases be arranged in groups with gaps between groups and preferential spacing in certain groups. It will be evident, however, that ordinarily at a particular lateral position of the hook bar the hooks will only be located at positions corresponding to certain pile yarn ends.

The hook bar element 41 has at one side of the loom (preferably the left as shown) a pin projection 50 which rides up and down in a slot 51 on head 52 of plunger 53 which is guided for sliding motion in sliding bearings 54 on frame 55. The plunger has secured thereon an abutment 56 which limits the movement of the plunger to the right in Figures 3 and 4 by engaging one of the sliding bearings 54.

Figure 3:
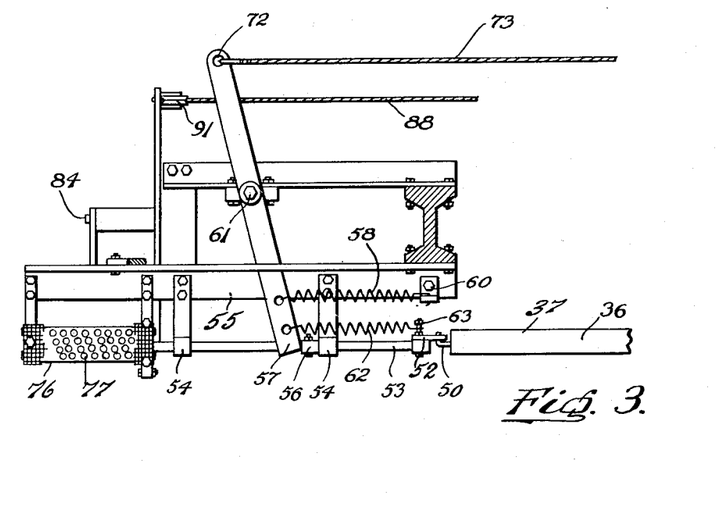
Figure 3 is a fragmentary diagrammatic top plan view of a selector mechanism for shifting the hook bar laterally.

The plunger and with it the hook bar element, regardless of the vertical position of the hooks under heddle control, is continuously urged toward the right in Figures 3 and 4 by the engagement of the end of lever 57 with the abutment 56, the lever end being urged toward the right by tension spring 58 acting from spring abutment 60 on the frame. The lever 57 has a fixed pivot 61 interfar the plunger is to be permitted to move to the left in Figures 3 and 4 under the action of the lever 57.

A jacquard cylinder 78 has sprocket teeth 80 which engage and progress cards 81 connected together in a sequence or band, as well known. The cylinder is pivoted at 82 on a lever 83 which has fixed pivotal mounting at 84 intermediate its ends on the frame. The movement of the cylinder to bring the cards into selecting position is accomplished by the cam 64 as already described, which at its opposite side engages follower roller 85 of lever 86, pivoted at one end on the frame by a fixed pivot 86′, and making connection at the other end 87 with a flexible connection 88 which reverses direction over a pulley 90 and then at the left of the loom turns up over pulley 91 and engages the remote end of lever 83 at 92 (Figure 7).

The cylinder has suitable recesses in line with the holes in the cards, and when the cylinder is raised and engages the selector pins 77, all pins remain down except the selected pin which encounters a blank in the card.

The cylinder is retained in its position during the motion up by spring detent 93 and when it moves down the hook end of pawl 94 pivoted on the frame at 95 engages a ratchet projection 95′ on the end of the cylinder and advances the cylinder one card distance, as well known in the art.

In some cases it is desired to lock the hooks in a raised inoperative position by the jacquard. This is accomplished in Figure 12 by pivoting locking hooks 96, on fixed pivots 96', and interconnecting them by a link 97, pivoted at both ends. A vertically slotted head 50' on one end of the hook bar housing 37 supports a bracket 98 which connects by link 99, pivoted at both ends, with one of the locking hooks 96. The slot in head 50' engages pin 51' on the head of plunger 53. In the limiting position to the right of Figure 12, the linkage causes locking hooks 96 to engage their hook ends 96² under locking pins 37' on housing 37, holding the hook bar housing so that it cannot move down under heddle control, causing a suitable spring or lost motion mechanism 99' in the heddle control to take up the motion without lowering the hook bar housing. As soon as the hook bar housing moves slightly to the left, however, the locking hooks release the hook bar housing (as shown by solid lines in Figure 12) so that it can move with the heddle control. If the hook bar is to remain inoperative, the jacquard simply selects the right hand pin, which prevents the hook bar housing from moving far enough to the left to release the locking hooks from the locking pins 37'.

Figure 13:
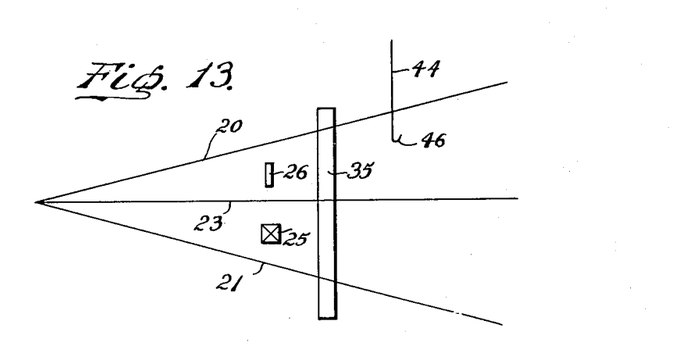
Figures 13, 14 and 15 show a weave which may be used with the structure of Figures 3 to 12. These are longitudinal conventional weave step diagrams.
Figure 14:
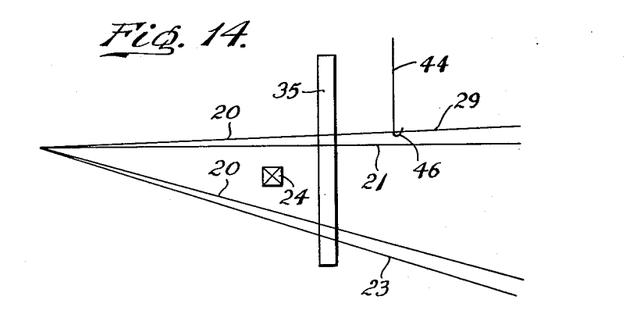
Figure 15:
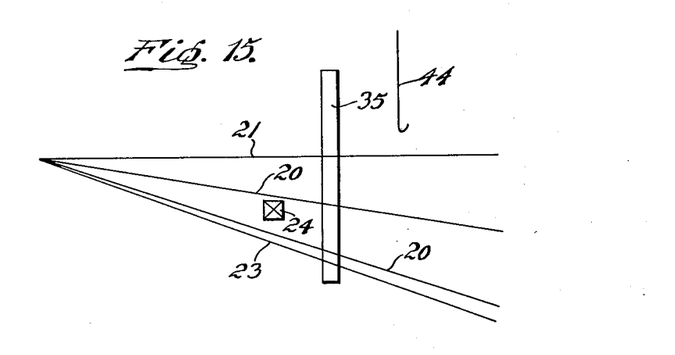

The actual weaving procedure according to one embodiment may be according to Table I, which should be considered in reference to Figures 13, 14 and 15. In the first step, as shown in Figure 13, with the pile warp heddle fully raised, the binder warp heddle lowered and the stuffer warp heddle raised half way, selection has been made by the jacquard, and cam 64 is in a position which holds the jacquard cylinder in engagement with the pins and which pulls lever 57 clockwise in Figure 3 to bring the hook bar as far as to the left as permitted until it engages the selected jacquard pin which bars its path and prevents further motion to the left. The hook bar is raised as shown in Figure 13, but the lower hook ends are below the pile warp ends. In this position a wire, which may be the wire 26 or the wire 26' as desired, is inserted in the upper shed, and a weft 25 is inserted in the lower shed. The reed beats up the wire and the weft in the usual way. Where the features of the invention are not to be used, the pile warp ends raised over the wire will form ordinarily pile projections, but where the features of the invention are being used they will form floats.

In the second step, as shown in Figure 14, the pile warp heddle is fully lowered, the binder warp heddle is raised half way, the stuffer warp heddle is lowered, and a shot of weft 24 is inserted. The hooks at the positions at which they are located have held selected ends over their lower hook ends, and the hooks have retained their same lateral position but have moved down to a position approximating but preferably slightly above the mid position. There are thus some float ends 29 which are selected and held up by the hooks in this position of Figure 14. This prevents these float ends from being bound by weft 24 which binds the ordinary pile warp ends.

In the third step, following Figure 14 and preceding Figure 15, the cam 64 has advanced far enough so that the lever 57 moves counterclockwise in Figure 3, carrying the plunger 53 and the hook bar to the right, and at the same time the card cylinder moves down, and turns, selecting a new card. The movement of the hook bar to the right causes the hooks to move away from the selected ends and drop the selected ends.

In the fourth step with the heddles in the same position and the hook bar still moving to the right, having released the selected ends, the jacquard cylinder moves up and the new card engages the jacquard selector pins, forcing the selected pin up above the jacquard plate into the path of the plunger.

In the fifth step, as shown in Figure 15, the heddle positions remain the same, the selection is complete, and the hook bar is raised vertically toward the position of Figure 13. In the meantime weft 24 has been beaten up by the reed.

In the sixth step, between Figures 15 and 13, with the heddle position the same, cam 64 advances and moves the plunger to the left while the hook bar continues moving up until it reaches the position of Figure 13.

The above operation is then repeated on the next cycle.

Figure 16:
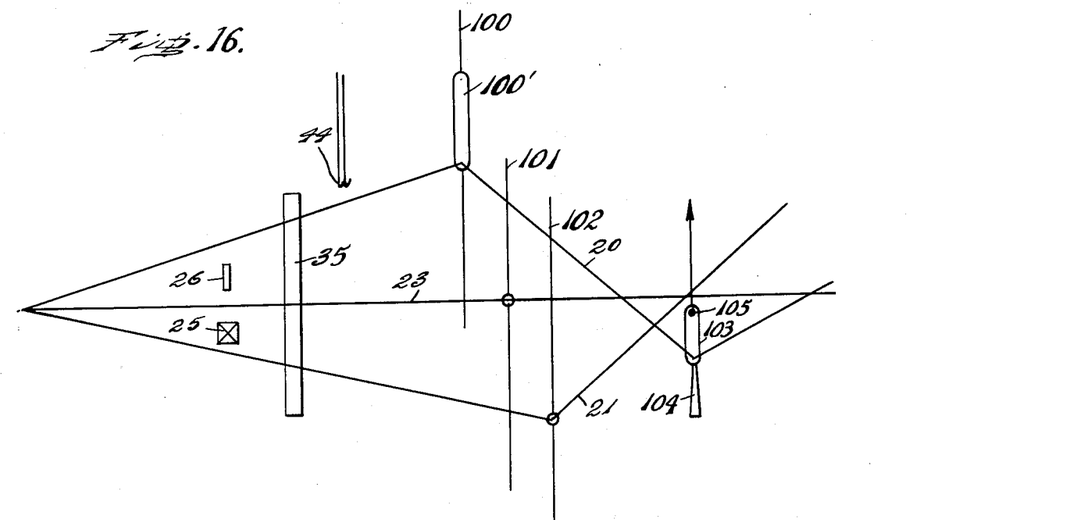
Figures 16 and 17 are weave step diagrams showing a preferred heddle construction using long slots and a preferred method of tensioning.
Figure 17:
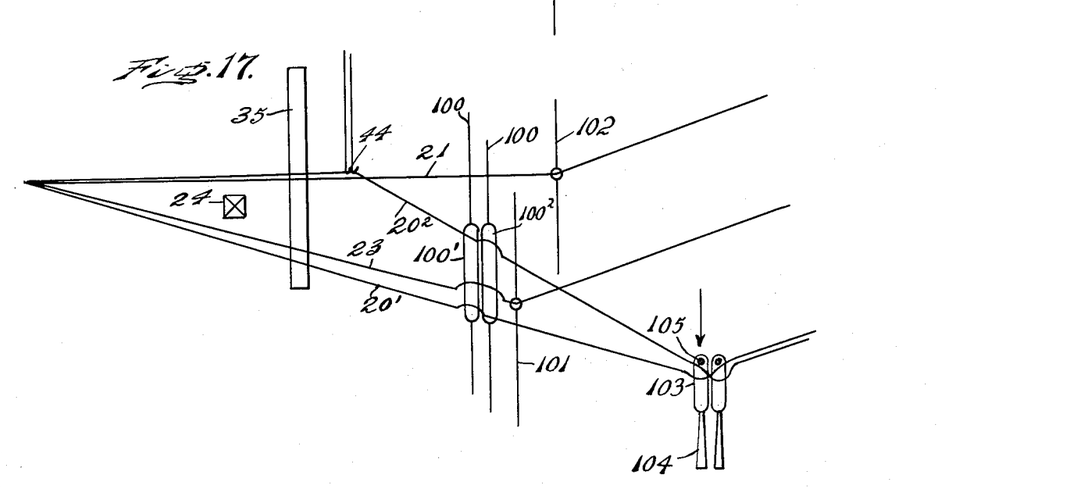

Figures 16 and 17 illustrate the behavior of the long slots, and the preferred tensioning technique which is used in weaving according to the invention.

In the position of Figure 16, the pile warp 20 is fully raised by raising the pile warp heddle 100 having long slots 100' and 100² which are shown more in detail in Figure 17. The ends pass from the long slots in Figure 16 to the fell suitably below the lower ends of hooks 44, so that in this position or in any other position except that in which the hooks are lowered, the hooks can be shifted laterally to a new selecting position. This is also the position in which the hooks can be locked out for one or more cycles according to Figure 12.

The stuffer warp is raised half way by stuffer warp heddle 101 and a single binder warp 21 (only one being used in this embodiment) is lowered by binder warp heddle 102. Wire 26 or 26' as the case may be is inserted in the upper shed and a shot of weft 25 is taken by the shuttle in the lower shed.

The pile warp ends are withdrawn either from a beam or preferably from a creel, through a normal tensioning device and then preferably through a supplemental tensioning device individual to each pile warp end. The supplemental tensioning device consists of a long slot or loop 103 suitably of wire individual to each end through which the pile warp end is threaded, and having a weight 104 hanging down from the long slot or loop. The long slot or loop 103 is preferably placed back of the heddles but in front of any primary tensioning device. A bar 105 extends fully across the loom through all of the long slots or loops 103 for the different ends and in the position of Figure 16 the bar is raised by action similar to the motion of the heddle to release the weights 104 from all of the pile warp ends so that all of the excess pile yarn which was normally pulled down by the weights is in this position available for weaving in the fabric over the wire.

This excess of yarn has been created by forming floats which are shorter than the corresponding normal sequence of pile projections added together.

Between the positions of Figures 16 and 17 the hook mechanism completes its lateral movement to the selecting position and then moves down in the manner of a heddle to a position (slightly above the mid position) in which the lower hook ends of the hooks 44 are beneath the pile warp ends 20 but above the binder warp ends 21 and the stuffer warp ends 23.

In the next step as shown in Figure 17, pile warp heddle 100 has moved to the lowermost position bringing pile warp ends 20' to the lower position but pile warp ends 20² are engaged over the hooks at a position above the half-raised position at which binder warp 21 is located. Stuffer warp 23 is in the lower position. A shot of weft 24 is now taken in the lower shed thus formed.

In the position of Figure 17, the bar 105 has moved down to allow the individual weights to bear on the individual pile warp ends. The selected pile warp ends which are raised over the hooks extend up in the long slots of the pile warp heddles which in this case are shown at 100' moved out of line with the other long slots 100² merely for convenience in illustration (they are actually one behind another in this view).

After the operation as shown in Figure 17, the hooks are caused to release the selected pile warp ends as already described, after which the hook bar can be raised to the position of Figure 16 and manipulated laterally to a position in which it will engage and hold different ends in float position on the next cycle.

Figures 16 and 17 show two hook bars separately manipulated laterally to different lateral positions to suggest that any desired number of hook bars can be used.

Figure 18:
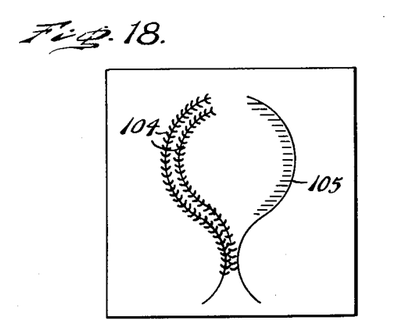
Figure 18 is a diagram showing one feature of the invention, viewed from the face of the fabric.

As shown in Figure 18, the invention is applicable to produce two or more float lines in the fabric. These float lines 104 here shown are formed by one hook bar and if desired float lines 105 are formed by a second hook bar, the two hook bars being placed one behind another between the reed and the heddles and engaging and holding up different ends as determined by their individual jacquard mechanisms.

Of course it will be evident that if desired the hook bar can be rendered inoperative by simply holding it above the shed for any desired number of sequences and then bringing it into operation again.

Figure 19:
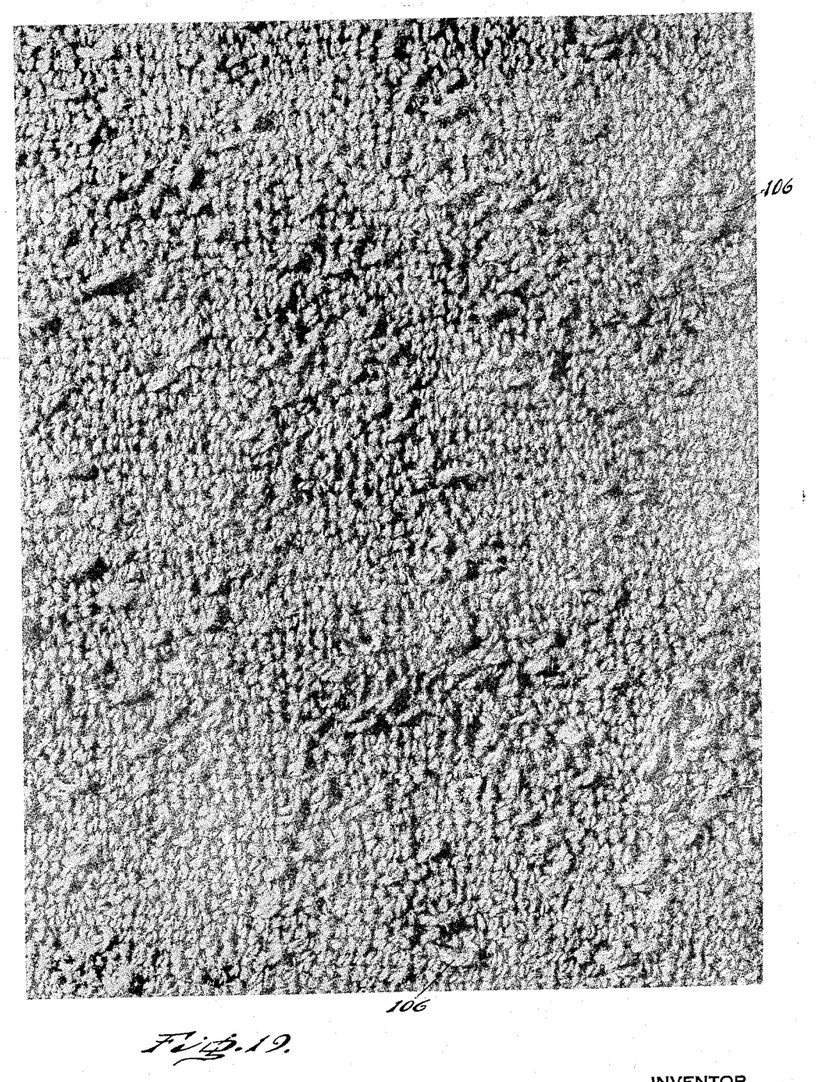
Figures 19, 20 and 21 are photographic reproductions of fabrics woven in accordance with the invention.
Figure 20:
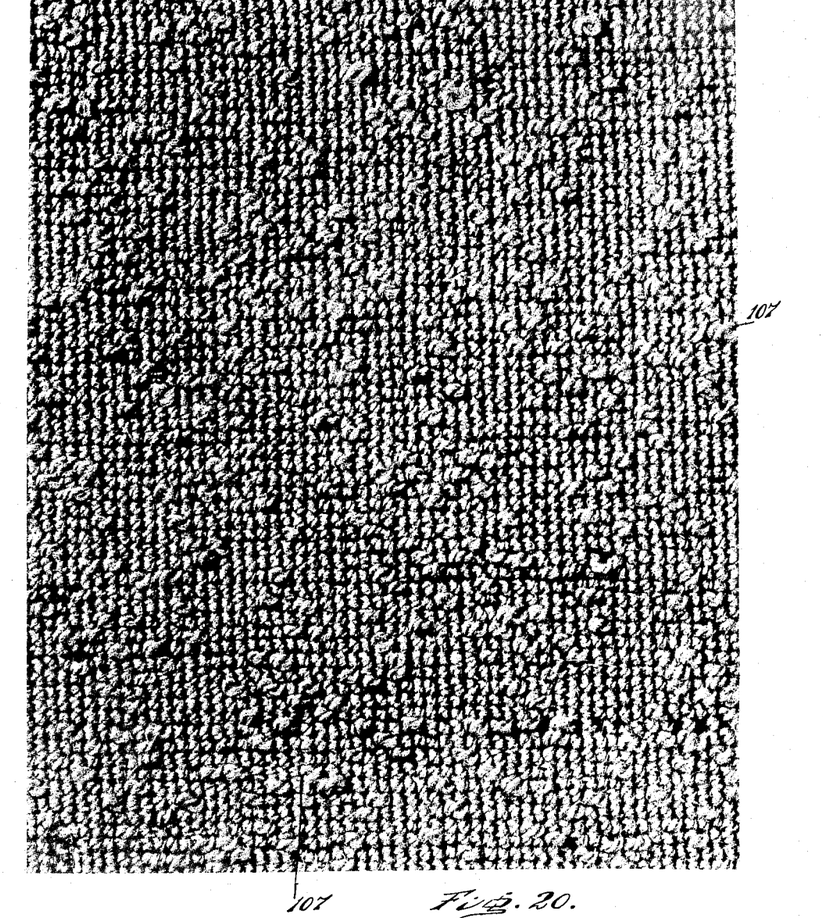
Figure 21:
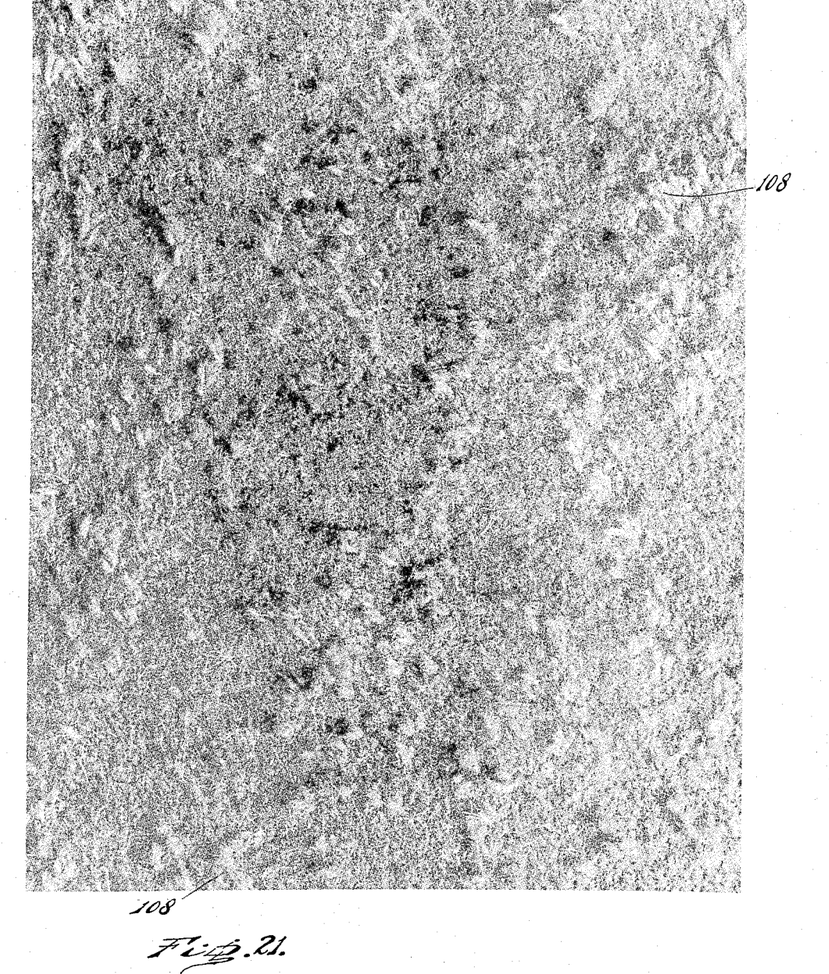

The product of the invention may involve float loops 106 as shown in Figure 19, which give a textured effect according to a pattern sequence, or they may involve float loops 107 which give a more pronounced random effect as shown in Figure 20, or they may employ float tufts 108 as illustrated in Figure 21 (cutting wires being used).

As already explained, the hooks may be positioned where the selected pile float ends will be carried up over the hooks in raising the pile warp heddle, or the hooks may move down to engage.

It will be evident, of course, that the floats which are created by the present invention can extend across one, two or even more face wefts before being bound behind the next weft if desired, and if desired combinations of floats of different lengths, or of floats some of which are cut and some of which are uncut, and also some of which are of one length and some of which are of another length may be employed in the same fabric.

In view of invention and disclosure variations and modifications to meet individual whim or particular need will doubtless become evident to others skilled in the art, to obtain all or part of the benefits of my invention without copying the structure, method and fabric shown, and I therefore claim all such insofar as they fall within the reasonable spirit and scope of my claims.

Having thus described my invention what I claim as new and desire to secure by Letters Patent is:

1. The method of making a float pile carpet, which comprises interweaving at least one pile warp, at least one binder warp, at least one stuffer warp and wefts, raising all ends of the pile warp over a wire at one transverse row to form pile, engaging hooks under certain pile warp ends and thereby holding them above the next binding weft to form floats while lowering other pile warp ends behind the next binding weft, raising all ends of the pile warp over a wire at the next transverse row to form floats from some pile warp ends and normal pile from other pile warp ends, and lowering the pile warp ends which formed floats behind the next binder weft.

2. The method of making a float pile carpet, which comprises interweaving at least one pile warp, at least one binder warp, at least one stuffer warp and wefts, raising all ends of the pile warp over a wire at one transverse row to form pile, engaging hooks under certain pile warp ends, and thereby holding them above the next binding weft to form floats while lowering other pile warp ends behind the next binding weft, raising all ends of the pile warp over a wire at the next transverse row to form the ends of floats from some pile warp ends and the beginnings of floats from other pile warp ends, engaging hooks under the pile warp ends forming the beginnings of floats and thereby holding them above the next binding weft to form new floats while lowering the pile warp ends which form the ends of floats behind the next binding weft, raising all ends of the pile warp over a wire at the next transverse row to form pile and lowering the pile warp ends which form the new floats behind the next binder weft.

3. The method of weaving a pile fabric, which comprises interweaving a pile warp, at least one binder warp, at least one stuffer warp and wefts, in the weaving raising pile warp ends over wires, and then lowering the pile warp ends to be bound behind a succeeding weft, engaging hooks under selected pile warp ends at intervals over the width of the fabric in raised position and thereby preventing these ends from being lowered beneath the weft, subsequently releasing the hooked pile warp ends and at a later stage in the operation engaging hooks under other pile warp ends and holding them up at different lateral positions to prevent different pile warp ends from being bound behind the next weft.

4. The method of weaving using hooks selectively positioned along the width of the fabric, which comprises fully raising all the ends of one pile warp, raising the ends of another warp half way, thus forming an upper shed, lowering the ends of another warp, inserting a wire in the upper shed, inserting a weft in the lower shed, fully lowering the pile warp and at the same time hooking selected pile warp ends and thereby holding the selected ends at half raised position, raising another warp to half raised position, inserting a weft between the lowered pile warp ends and the selected half raised pile warp ends, releasing the selected half raised pile warp ends and repeating the cycle while hooking selected pile warp ends up at different lateral positions.

5. The method of weaving using hooks selectively positioned along the width of the fabric, which comprises fully raising all the ends of one pile warp, raising the ends of another pile warp half way, thus forming an upper shed, lowering the ends of another warp, inserting a wire in the upper shed, inserting a weft in the lower shed, fully lowering the pile warp and at the same time hooking and holding up selected ends of the pile warp by hooks at half raised position, raising another warp to half raised position, inserting a weft between the lowered pile warp ends and the selected half raised pile warp ends, releasing the selected half raised pile warp ends, moving the hooks laterally to a new position for engagement of warps and repeating the cycle at the new position and withdrawing cutting wires and thereby cutting floats to form a raised effect.

6. The method of weaving a pile fabric, using a reed, heddles, and hooks for selectively holding certain pile warp ends in raised position, which comprises fully raising pile warp ends, half raising other warp ends, thus forming an upper shed, lowering other warp ends, thus forming a lower shed, inserting a wire in the upper shed, inserting a shot of weft in the lower shed, engaging selected pile warp ends over hooks and thereby holding them up, lowering all pile warp ends which are not engaged over hooks and holding the pile warp ends engaged over hooks in half raised position, distributing other warp ends selectively in lowered and half raised positions, thus forming a lower shed, inserting a shot of weft in the lower shed, releasing the pile warp ends held over the hooks, and moving the hooks to a new selecting position.

7. The method of weaving a pile fabric, using a reed, heddles including a pile warp heddle having long slots, and hooks for selectively holding certain pile warp ends in raised position, which comprises positioning the hooks at a selected lateral position, raising the pile warp by the pile warp heddle to a fully raised position, raising another warp to half raised position and thereby forming an upper shed, lowering another warp and thereby forming a lower shed, inserting a wire in the upper shed, inserting a shot of weft in the lower shed, holding selected pile warp ends over hooks just above the half raised position, lowering the ends not engaged over the hooks to the lowered position, the ends engaged over the hooks being raised relatively in the long slots, half raising another warp and lowering another warp, thus forming a lower shed, inserting a shot of weft in the lower shed, releasing the pile warp ends engaged over the hooks, and shifting the hooks laterally.

8. The method of weaving a pile fabric, using a reed, heddles including a pile warp heddle having long slots, hooks for selectively holding certain pile warp ends in raised position and weights individually engaged over the pile warp ends behind the heddle, which comprises positioning the hooks in a selected lateral position, raising the pile warp ends by the pile warp heddle to a fully raised position, releasing the pull of the weights on the individual pile warp ends, raising another warp to half raised position and thereby forming an upper shed, lowering another warp and thereby forming a lower shed, inserting a wire in the upper shed, inserting a weft in the lower shed, holding selected ends over the hooks just above the half raised position, applying the pull of the weights to the individual pile warp ends, lowering the pile warp heddle to the lower position and thereby relatively raising selected pile warp ends in the long slots while lowering the other pile warp ends, half raising another warp and lowering another warp, thus forming a lower shed, inserting a shot of weft in the lower shed, releasing the hooks, and shifting the hooks laterally to a new position.

9. The method of weaving a pile fabric, which comprises raising pile warp ends over a wire and inserting a shot of weft between other warp ends, lowering the pile warp ends, raising another warp half way, and selectively as the pattern requires holding certain pile warp ends over hooks in selected lateral half raised positions and as the pattern requires lowering all pile warp ends and binding the same behind a weft.

10. The method of weaving a pile fabric, using hooks at intervals laterally corresponding to less than all of the dents, which comprises fully raising the pile warp to a position above the lower ends of the hooks, lowering the binder warp, raising the stuffer warp half way, thus forming an upper shed and a lower shed, inserting a wire in the upper shed, inserting a shot of weft in the lower shed, fully lowering the rejected ends of the pile warp, holding the selected ends of the pile warp by the hooks at a position adjoining the mid-position, raising the binder warp half way, lowering the stuffer warp, thus forming a lower shed, inserting a shot of weft in the lower shed, manipulating the hooks laterally to release the selected pile warp ends from the hooks, raising the hooks to a position above their lowermost position at which their lower ends are below the fully raised position of the pile warps and shifting the hooks laterally to a new position in accordance with pattern selection.

11. The method of weaving a pile fabric, using hooks at intervals laterally corresponding to less than all of the dents, which comprises fully raising the pile warp to a position above the lower ends of the hooks, lowering the binder warp, raising the stuffer warp half way, thus forming an upper shed and a lower shed, inserting a wire in the upper shed, inserting a shot of weft in the lower shed, fully lowering the rejected ends of the pile warp, holding the selected ends of the pile warp by the hooks at a position immediately above the mid-position, raising the binder warp half way, lowering the stuffer warp, thus forming a lower shed, inserting a shot of weft in the lower shed, manipulating the hooks laterally to release the selected pile warp ends from the hooks, raising the hooks to a position above their lowermost position at which their lower ends are below the fully raised position of the pile warps and shifting the hooks laterally to a new position in accordance with pattern selection.

12. A velvet pile fabric loom including mechanism to manipulate a pile warp and a reed, in combination with spaced hooks behind the reed adapted to engage and hold up selected pile warp ends in half raised positions, means for moving the hooks laterally to different positions and means for releasing the yarn from the hooks.

13. A pile fabric loom including a reed, and means for manipulating various warps, in combination with spaced hooks behind the reed adapted to engage and hold up selected pile warp ends in half raised position, means for moving the hooks laterally to different positions, means for releasing yarn from the hooks, and means for raising and lowering the hooks.

14. A pile fabric loom including a reed and means for manipulating warps, in combination with spaced hooks behind the reed adapted to engage and hold up selected pile warp ends in half raised position, means for moving the hooks laterally to different positions, means for releasing yarn from the hooks, and a pile warp heddle including long slots adapted to allow pile warp ends to move relatively upwardly in the slots when the ends are engaged over the hooks.

15. A pile fabric loom including a reed and means for manipulating warps, in combination with spaced hooks behind the reed adapted to engage and hold up selected pile warp ends in half raised position, means for moving the hooks laterally to different positions, means for releasing yarn from the hooks, weights individual to the respective pile warp ends and means for relaxing the pull of the weights.

16. A pile fabric loom including a reed and means for manipulating warps, in combination with spaced hooks behind the reed adapted to engage and hold up selected pile warp ends in half raised position, means for moving the hooks laterally to different positions, means for releasing the yarn from the hooks, a pile warp heddle having long slots for manipulating the pile warp ends and permitting them to rise in the long slots when they are engaged over the hooks, weights applied individually to pile warp ends behind the pile warp heddle, and means operative when the pile warp ends are fully raised to lift the individual weights.

17. A pile fabric loom having a reed, heddles and wires, in combination with a hook bar slidably positioned behind the reed and between the reed and the heddles, slots in the hook bar corresponding to dent positions of the reed, hooks removably engaged in the slots and adapted to be positioned in any desired slots, the hooks extending down to a position within the shed, and means for manipulating the hook bar laterally under pattern control.

18. A pile fabric loom having a reed, wires and heddles in combination with a hook bar extending across between the reed and the heddles, hooks depending from the hook bar, reciprocating means movable laterally at one end of the hook bar and connected thereto, and pattern control mechanism for manipulating the reciprocable means to carry the hook bar laterally to a predetermined position at successive steps in weaving.

19. A pile fabric loom having a reed, wires and heddles in combination with a hook bar extending across between the reed and the heddles, hooks depending from the hook bar, reciprocating means movable laterally at one end of the hook bar and connected thereto, a jacquard mechanism having pins which on selection place a selected pin in the path of the reciprocating means, and means for moving the reciprocating means laterally as far as permitted by the selected pin and thereby stopping the reciprocating means and the hook bar in a predetermined position.

20. A pile fabric loom having a reed, wires and heddles in combination with a hook bar extending across between the reed and the heddles, hooks depending from the hook bar, reciprocating means movable laterally at one end of the hook bar and connected thereto a lost motion connection between the hook bar and the reciprocating means permitting the hook bar to move vertically after the manner of a heddle, jacquard mechanism including selector pins, one of which on selection is placed in the path of motion of the reciprocating means, and means for moving the reciprocating means laterally as far as permitted by the selected pin and thereby laterally moving the hook bar at a predetermined step in weaving.

21. The method of making a flat pile carpet, which comprises interweaving at least one pile warp, at least one binder warp, at least one stuffer warp and wefts, raising all ends of the pile warp over a wire at one transverse row to form pile, selectively according to a pattern engaging hooks under certain pile warps ends and thereby holding them above the next binding weft to form floats while lowering other pile warp ends behind the next binding weft, raising the ends of the pile warp over a wire at the next transverse row to form floats from some pile warp ends and normal pile from other pile warp ends, lowering the pile warp ends which formed floats behind the next binding weft, and selectively as the pattern requires binding all pile warp ends behind the next binding weft at particular transverse rows.

22. A pile fabric loom according to claim 13, in combination with pattern control means for holding the hooks selectively in inoperative position on particular cycles of weaving.

References Cited in the file of this patent

UNITED STATES PATENTS

| Number | Name | Date |
|---|---|---|
| 179,334 | Miller | June 27, 1876 |
| 775,970 | Hartley | Nov. 29, 1904 |
| 783,818 | Buckler | Feb. 28, 1905 |
| 1,561,282 | Sandeman | Nov. 10, 1925 |
| 1,799,226 | Gilhet | Apr. 7, 1931 |
| 2,430,559 | Dacey | Nov. 11, 1947 |
| 2,553,303 | Crawford | May 15, 1951 |
| 2,576,791 | Jackson | Nov. 27, 1951 |
| 2,610,652 | Parker | Sept. 16, 1952 |
| 2,638,934 | Parker | May 19, 1953 |
| 2,674,269 | Groat | Apr. 6, 1954 |

FOREIGN PATENTS

| 8,062 | Great Britain | June 4, 1887 |